United States Patent
Jovanovic et al.

(10) Patent No.: US 12,519,561 B2
(45) Date of Patent: Jan. 6, 2026

(54) NETWORK NODE AND METHOD FOR LINK ADAPTION IN A WIRELESS COMMUNICATION NETWORK

(71) Applicant: Telefonaktiebolaget LM Ericsson (publ), Stockholm (SE)

(72) Inventors: Aleksandar Jovanovic, Bromma (SE); Ahmedul Quadir, Sollentuna (SE); David Better, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 253 days.

(21) Appl. No.: 18/278,047

(22) PCT Filed: Mar. 11, 2022

(86) PCT No.: PCT/SE2022/050243
§ 371 (c)(1),
(2) Date: Aug. 21, 2023

(87) PCT Pub. No.: WO2022/216197
PCT Pub. Date: Oct. 13, 2022

(65) Prior Publication Data
US 2024/0063938 A1    Feb. 22, 2024

Related U.S. Application Data

(60) Provisional application No. 63/172,302, filed on Apr. 8, 2021.

(51) Int. Cl.
*H04L 1/00* (2006.01)
*H04L 1/20* (2006.01)

(52) U.S. Cl.
CPC .......... *H04L 1/0009* (2013.01); *H04L 1/0003* (2013.01); *H04L 1/203* (2013.01)

(58) Field of Classification Search
CPC ..... H04L 1/0009; H04L 1/0003; H04L 1/203; H04L 1/0015
See application file for complete search history.

(56) References Cited

U.S. PATENT DOCUMENTS

| | | |
|---|---|---|
| 2007/0160122 A1 | 7/2007 | Yoshida |
| 2014/0126467 A1 | 5/2014 | Lu et al. |

(Continued)

FOREIGN PATENT DOCUMENTS

| | | |
|---|---|---|
| CN | 112383333 A | 2/2021 |
| EP | 3014799 B1 | 8/2018 |

(Continued)

OTHER PUBLICATIONS

Author Unknown, "Technical Specification Group Radio Access Network; NR; Physical layer procedures for data (Release 16)," Technical Specification 38.214, Version 16.5.0, Mar. 2021, 3GPP Organizational Partners, 171 pages.

(Continued)

*Primary Examiner* — Abdullahi Ahmed
(74) *Attorney, Agent, or Firm* — Withrow & Terranova, PLLC

(57) ABSTRACT

A method is performed by a network node for handling link adaptation for a communication between the network node and a User Equipment, UE, in a wireless communications network. The method comprises: obtaining an initial Information Carrying Capacity, ICC, estimate; and establishing a measurement at each Hybrid Automatic Repeat Request, HARQ, feedback on an initial transmission in the communication. The measurement comprises a Block Error Rate, BLER, per: rank, Modulation and Coding Scheme, MCS, and slot. Based on the established measurement it is determining whether or not to adjust the initial ICC estimate, and whether or not to disable outer loop ICC adjustments. The determining is to be used as a basis for the link adaptation of said communication. A corresponding network node is also presented.

14 Claims, 11 Drawing Sheets

(56) References Cited

U.S. PATENT DOCUMENTS

| | | |
|---|---|---|
| 2015/0117321 A1 | 4/2015 | Chen et al. |
| 2015/0124901 A1 | 5/2015 | Xu et al. |
| 2017/0142696 A1* | 5/2017 | Kim .................... H04L 1/0009 |
| 2019/0028233 A1 | 1/2019 | Bontu et al. |
| 2019/0260451 A1 | 8/2019 | Sarkis et al. |
| 2020/0099467 A1* | 3/2020 | Wang .................... H04L 1/0013 |
| 2022/0109532 A1* | 4/2022 | Talarico ............. H04L 27/0006 |
| 2022/0123853 A1* | 4/2022 | Chandran ............. H04L 5/0085 |
| 2022/0408445 A1* | 12/2022 | Sun ..................... H04B 7/0486 |
| 2023/0103450 A1* | 4/2023 | Wang .................... H04L 1/0025 |
| | | 370/332 |
| 2024/0305403 A1* | 9/2024 | Mandelli .............. H04L 1/0003 |

FOREIGN PATENT DOCUMENTS

| | | |
|---|---|---|
| WO | 2018127765 A1 | 7/2018 |
| WO | 2019191979 A1 | 10/2019 |

OTHER PUBLICATIONS

Wu, et al., "Q-Learning based Link Adaptation in 5G," 31st Annual International Symposium on Personal, Indoor and Mobile Communications: Track 2: Networking and MAC, Aug. 31, 2020, IEEE, 6 pages.

International Search Report and Written Opinion for International Patent Application No. PCT/SE2022/050243, mailed May 12, 2022, 12 pages.

Extended European Search Report for European Patent Application No. 22785067.4, mailed Jan. 10, 2025, 9 pages.

\* cited by examiner

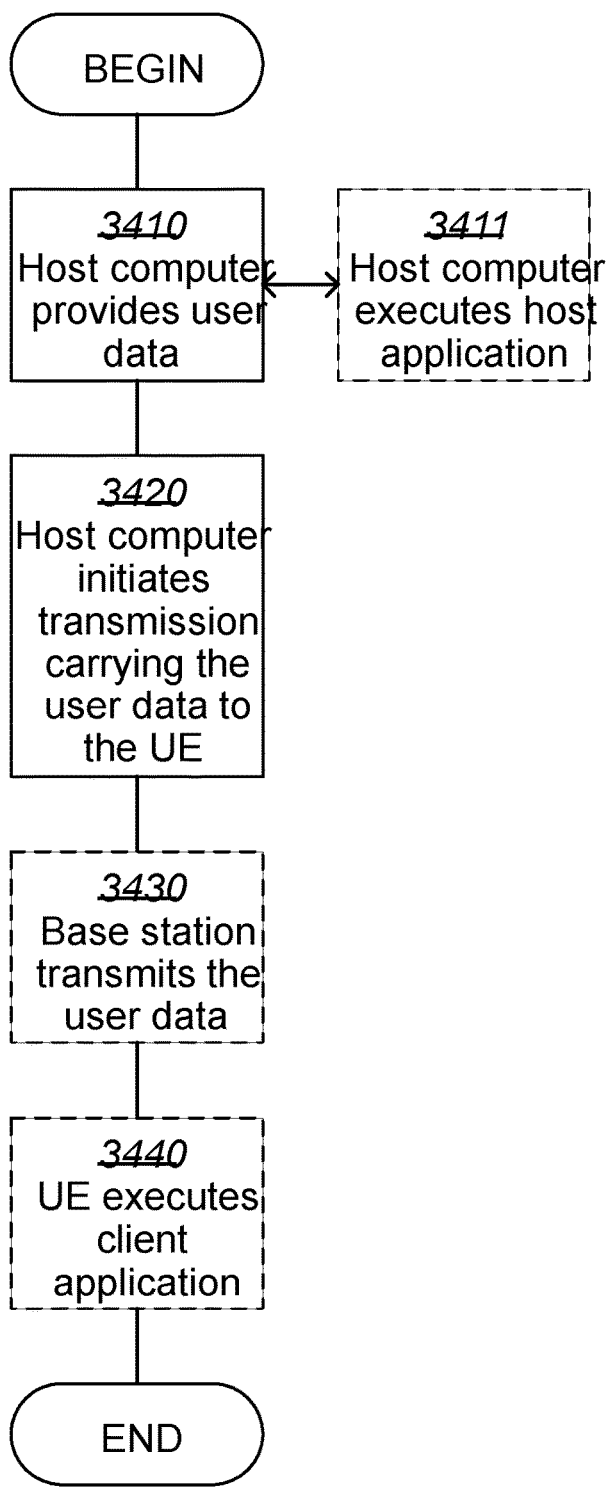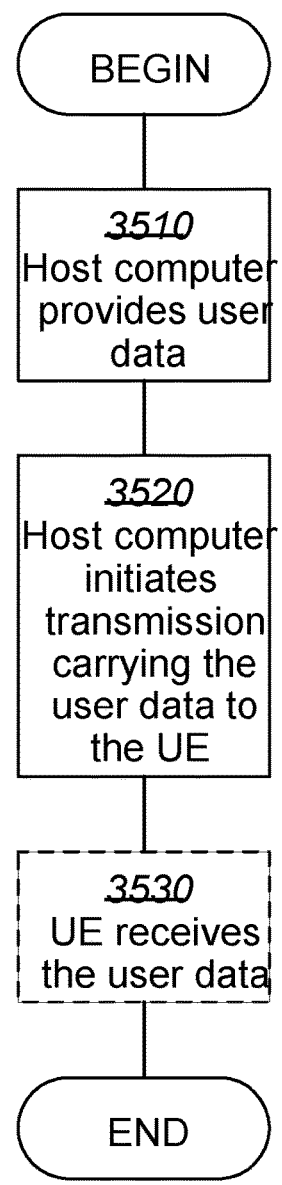
FIG. 10
FIG. 11

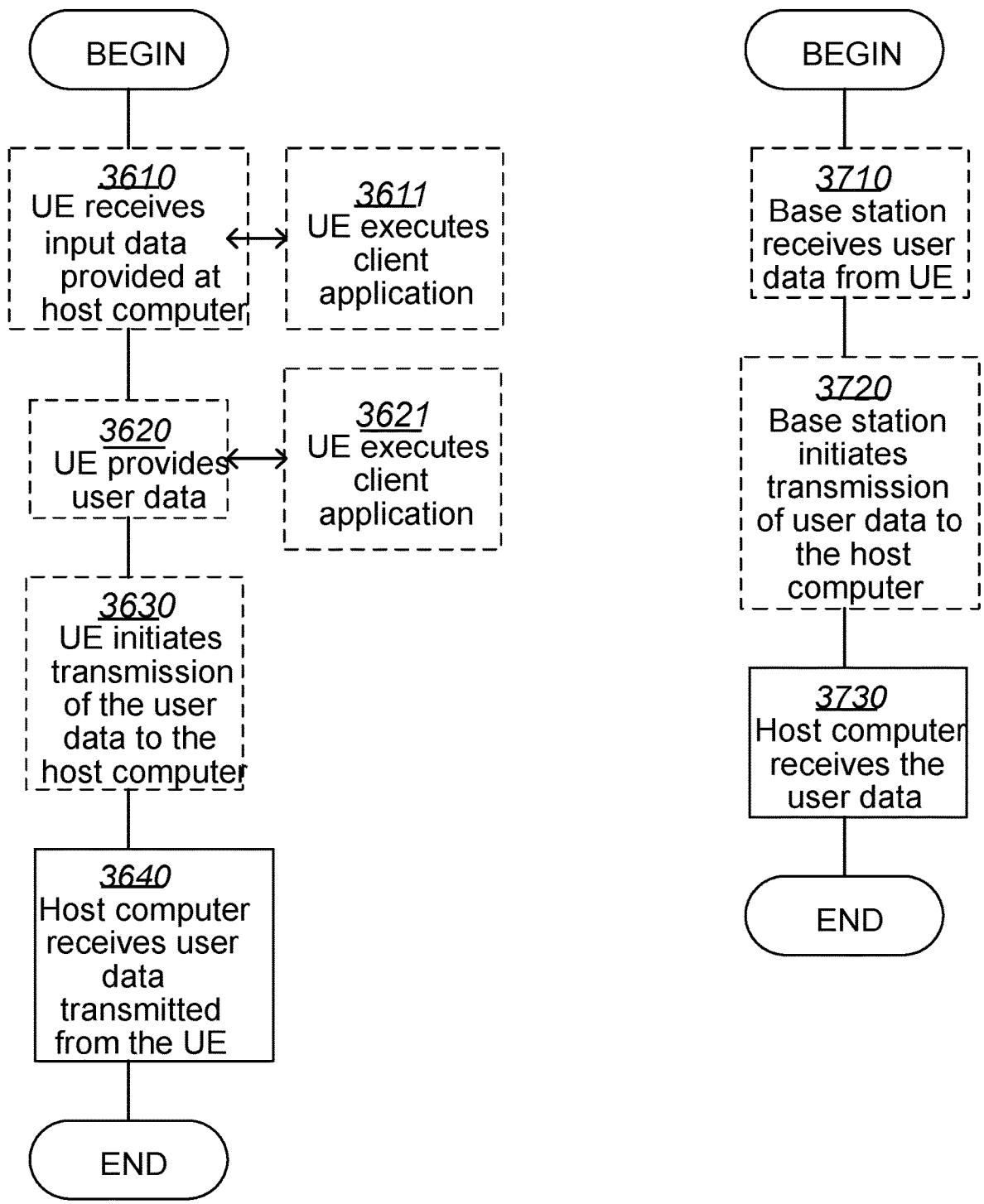

NETWORK NODE AND METHOD FOR LINK ADAPTION IN A WIRELESS COMMUNICATION NETWORK

This application is a 35 U.S.C. § 371 national phase filing of International Application No. PCT/SE2022/050243, filed Mar. 11, 2022, which claims the benefit of provisional patent application Ser. No. 63/172,302, filed Apr. 8, 2021, the disclosures of which are incorporated herein by reference in their entireties.

TECHNICAL FIELD

The proposed technology presented herein relates to a method, a network node, a computer program for handling link adaptation in a wireless communications network.

BACKGROUND

In a typical wireless communication network, wireless devices, also known as wireless communication devices, mobile stations, stations (STA) and/or User Equipments (UE), communicate via a Wide Area Network or a Local Area Network such as a Wi-Fi network or a cellular network comprising a Radio Access Network (RAN) part and a Core Network (CN) part. The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in Fifth Generation (5G) telecommunications. A service area or cell area is a geographical area where radio coverage is provided by the radio network node. The radio network node communicates over an air interface operating on radio frequencies with the wireless device within range of the radio network node.

3GPP is the standardization body for specify the standards for the cellular system evolution, e.g., including 3G, 4G, 5G and the future evolutions. Specifications for the Evolved Packet System (EPS), also called a Fourth Generation (4G) network, have been completed within the 3rd Generation Partnership Project (3GPP). As a continued network evolution, the new releases of 3GPP specifies a 5G network also referred to as 5G New Radio (NR).

Frequency bands for 5G NR are being separated into two different frequency ranges, Frequency Range 1 (FR1) and Frequency Range 2 (FR2). FR1 comprises sub-6 GHz frequency bands. Some of these bands are bands traditionally used by legacy standards but have been extended to cover potential new spectrum offerings from 410 MHz to 7125 MHz. FR2 comprises frequency bands from 24.25 GHz to 52.6 GHz. Bands in this millimeter wave range have shorter range but higher available bandwidth than bands in the FR1.

Multi-antenna techniques may significantly increase the data rates and reliability of a wireless communication system. For a wireless connection between a single user, such as UE, and a base station, the performance is in particular improved if both the transmitter and the receiver are equipped with multiple antennas, which results in a Multiple-Input Multiple-Output (MIMO) communication channel. This may be referred to as Single-User (SU)-MIMO. In the scenario where MIMO techniques is used for the wireless connection between multiple users and the base station, MIMO enables the users to communicate with the base station simultaneously using the same time-frequency resources by spatially separating the users, which increases further the cell capacity. This may be referred to as Multi-User (MU)-MIMO. Note that MU-MIMO may benefit when each UE only has one antenna. Such systems and/or related techniques are commonly referred to as MIMO.

Link adaptation (LA) algorithms are designed to meet an average Block Error Rate (BLER) target. LA algorithms in a base station, exploit a control loop to adjust a Signal-to-interference-plus-noise ratio (SINR) estimate recovered from a Channel Quality Indicator (CQI), and hence a Modulation and Coding Scheme (MCS), so as to meet a long-term BLER target.

Link adaptation for Physical Downlink Shared Channel (PDSCH) and Physical Uplink Shared Channel (PUSCH) comprises:

Inner loop MCS selector targeting a fixed Block Error Rate of 10% for all Hybrid Automatic Repeat Request (HARQ) transmissions, and Outer loop channel quality corrector based on HARQ. Acknowledgment (ACK) and/or Negative ACK (NACK) feedback to enforce the BLER target.

For PDSCH, Channel State Information (CSI) reported by UE, CQI and/or Rank Indicator (RI), is commonly used as channel quality input for LA.

For PUSCH, received SINR is measured in the base station and used as channel quality input for LA.

An overview of how this is performed is illustrated in FIG. 1.

Below examples is for Downlink (DL), but the idea applies to Uplink (UL) as well.

Very Simplified Link Adaptation Function

Information Carrying Capacity (ICC) when used herein may refer to how many data bits that each resource element is carrying. A higher value indicates a higher code-rate and/or higher modulation. A lower value indicates the opposite.

Outer Loop Adjustment (OLA) when used herein means an adjustment of an ICC estimate, which in turn affects the SINR value. The adjustment is performed based on HARQ feedback to meet a target block error rate.

FIG. 2 illustrates a DL LA overview and may comprise the following steps:

1. Get CQI report from the UE
2. CQI is translated to ICC, for the BLER target of 10%. 3GPP TS 38.214 Table 5.2.2.1-2, and as below Table 1.
   The same table give spectral efficiency, ICC, defined as Transport Block Size (TBS or TB Size) with Cyclic Redundancy Check (CRC) per Resource Element (RE): $ICC=(TBS+CRC)/N_{(RE,tot)}=Q\_m \cdot code\ rate$.
3. Adjust the ICC according to ACK/NACK feedback loop.
4. Determine the MCS based on the adjusted ICC:
   3GPP TS 38.214 Table 5.1.3.1-1: MCS index table 1, and referred to as Table 2 below, for PDSCH, or
   3GPP TS 38.214 Table 5.1.3.1-2: MCS index table 2 for PDSCH.

5 Calculate TBS based on steps in 3GPP 38.214, section 5.1.3.2.

6. Transmit data.

TABLE 5.2.2.1-2

4-bit CQI Table

| CQI Index | modulation | code rate × 1024 | efficiency |
|---|---|---|---|
| 0 | out of range | | |
| 1 | QPSK | 78 | 0.1523 |
| 2 | OPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 18QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Table 1 Relates to 3GPP TS 38.214 Table 5.2.2.1-2.

Table 1 Relates to 3GPP TS 38.214 Table 5.2.2.1-2.

< 38.214 - Table 5.1.3.1-1: MCS index table 1 for PDSCH >

| MCS Index $I_{MCS}$ | Modulation Order $Q_m$ | Target code Rate × [1024] R | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

Table 2 relates to the MCS index table 1 for PDSCH referred to as 3GPP TS 38.214 Table 5.1.3.1-1.

Table 2 relates to the MCS index table 1 for PDSCH referred to as 3GPP TS 38.214 Table 5.1.3.1-1.

FIG. 3 illustrates computing of transport block size in LTE with the use of the below Table 3.

TABLE 3

| MCSI | TBSI | MCS-modulation |
|---|---|---|
| 0 | 0 | QPSK |
| 1 | 1 | |
| 2 | 2 | |
| 3 | 3 | |
| 4 | 4 | |
| 5 | 5 | |
| 6 | 6 | |
| 7 | 7 | |
| 8 | 8 | |
| 9 | 9 | |
| 10 | 9 | 16QAM |
| 11 | 10 | |
| 12 | 11 | |
| 13 | 12 | |
| 14 | 13 | |
| 15 | 14 | |
| 16 | 15 | |
| 17 | 15 | 64QAM |
| 18 | 16 | |
| 19 | 17 | |
| 20 | 18 | |
| 21 | 19 | |
| 22 | 20 | |
| 23 | 21 | |
| 24 | 22 | |
| 25 | 23 | |
| 26 | 24 | |
| 27 | 25 | |
| 28 | 26 | |
| 29 | | |
| 30 | | |
| 31 | | |

SUMMARY

There currently exist certain challenges.

As part of developing embodiments herein a problem is identified and first discussed.

From field and laboratory tests a higher NACK ratio has been observed in a certain slot, MCS, rank or combination of those. A NACK ratio when used herein means number of HARQ NACK reported by UE/(HARQ ACK+HARQ NACK). A rank when used herein means a rank used by a network for the given transmission.

This may be caused by different reasons, where some are stated below:

In NR, a UE performs more processing for channel estimation and noise cancellation. It is a big challenge for a UE to calculate a proper channel for reporting CSI, rank and Pre-coding Matrix Indicator (PMI) to a base station.

There is some latency in this loop while LA decision is taken on Transmission Time Interval (TTI) level. Because of the delay, the reported rank may not reflect the exact radio conditions at the moment.

The UE may have problem with Error Vector Magnitude (EVM) and code rate in some slots and MCS and rank.

The UE differs in how aggressive they are in reporting higher rank and MCS. Aggressive reporting when used herein may mean that a UE is reporting higher rank and/or CQI than the channel can carry to meet the BLER target.

Various control channels may be sent regularly on specific slots, causing elevated interference to the neighboring cells on those slots, for instance:

CSI Reference Signal (CSI-RS) or Tracking Reference Signal (TRS) to PDSCH interference is causing high PDSCH BLER at CSI-RS slots.

Interference periodicity interval could be 1 or more System Frame Number (SFN). For that purpose a slot number is defined by slotNo+ slot_per_SFN*(SFN % k), where k is periodicity in SFNs.

As a consequence, certain combination of rank, MCS and slot NACK ratio may be high.

Certain aspects of the present disclosure and their embodiments may provide solutions to these or other challenges An object of embodiments herein is to provide an improved throughput in a wireless communications network, in particular by providing a method for more efficiently and accurately handling link adaptation.

According to a first aspect of embodiments herein, the object is achieved by a method performed by a network node for handling link adaptation for a communication between the network node and a User Equipment, UE, in a wireless communications network.

The method comprises:
- obtaining an initial Information Carrying Capacity, ICC, estimate,
- establishing a measurement at each Hybrid Automatic Repeat Request, HARQ, feedback on an initial transmission in the communication, which measurement comprises a Block Error Rate, BLER, per: rank, Modulation and Coding Scheme, MCS, and slot, and
- based on the established measurement, determining whether or not to adjust the initial ICC estimate, and whether or not to disable outer loop ICC adjustments, which determining is to be used as a basis for the link adaptation of said communication.

According to second aspect of the embodiments herein, the object is achieved by a network node configured to handle link adaptation for a communication between the network node and a User Equipment, UE in a wireless communications network. The network node is further being configured to:
- obtain an initial Information Carrying Capacity, ICC, estimate,
- establish a measurement, at each Hybrid Automatic Repeat Request, HARQ, feedback on an initial transmission in the communication, which measurement is adapted to comprise a Block Error Rate, BLER, per: rank, Modulation and Coding Scheme, MCS, and slot, and
- based on the established measurement, determine whether or not to adjust the initial ICC estimate, and whether or not to disable outer loop ICC adjustments, which determining is adapted to be used as a basis for the link adaptation of said communication.

An advantage of embodiments herein is that a more accurate LA is provided since the BLER target is achieved more accurate, resulting in an improved throughput.

BRIEF DESCRIPTION OF THE DRAWINGS

The embodiments, together with further objects and advantages thereof, may best be understood by making reference to the following description taken together with the accompanying drawings, in which:

FIG. 10-13 are flowcharts illustrating methods implemented in a communication system including a host computer, a base station and a user equipment.

DETAILED DESCRIPTION

Embodiments herein provide methods performed by a network node for handling link adaptation for a communication between the network node and a User Equipment, UE, in a wireless communications network.

Figure 5:
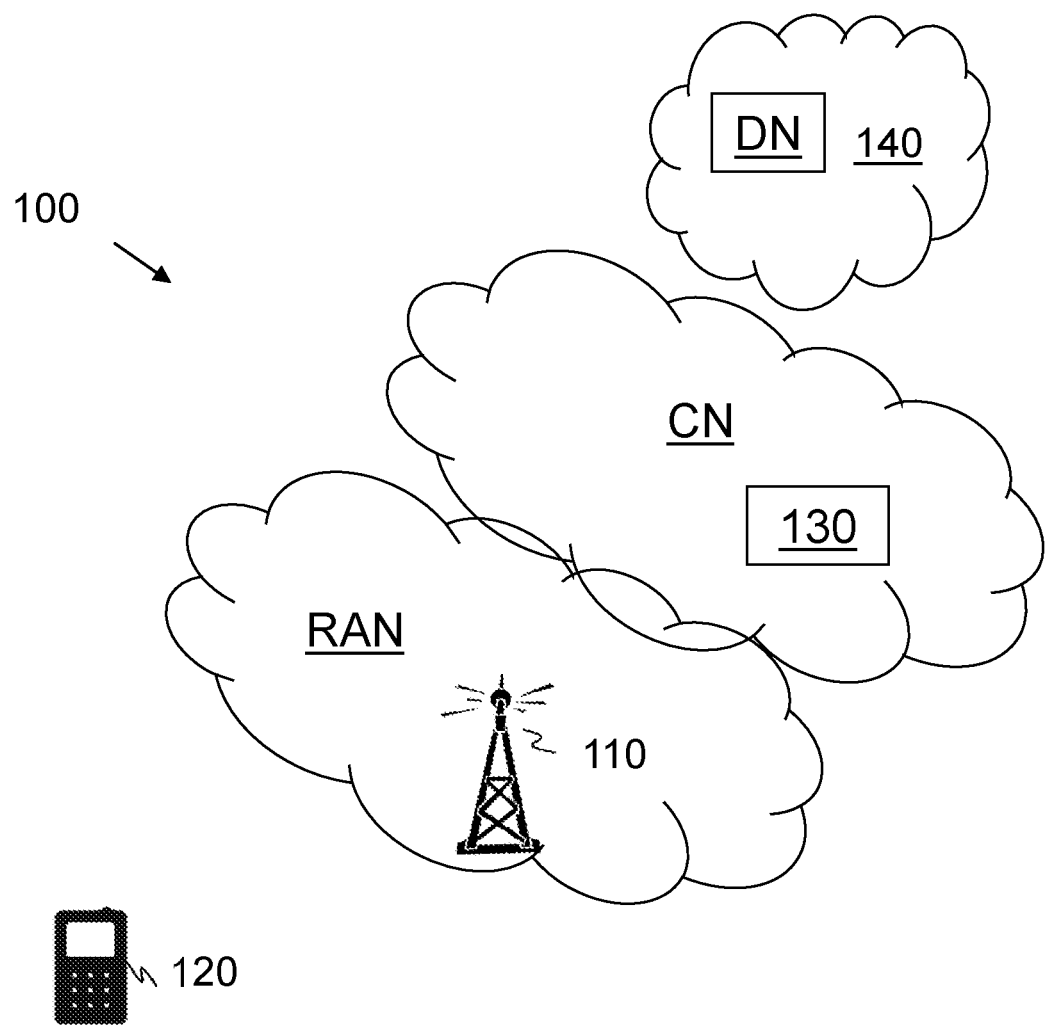
FIG. 5 is a schematic overview illustrating embodiments of a wireless communications network.

FIG. 5 is a schematic overview depicting a wireless communications network 100 wherein embodiments herein may be implemented. The wireless communications network 100 comprises one or more RANs and one or more CNs. The wireless communications network 100 may use 5G NR but may further use a number of other different technologies, such as, Wi-Fi, (LTE), LTE-Advanced, Wideband Code Division Multiple Access (WCDMA), Global System for Mobile communications/enhanced Data rate for GSM Evolution (GSM/EDGE), or Ultra Mobile Broadband (UMB), just to mention a few possible implementations.

Network nodes such as a network node 110 operate in the wireless communications network 100, by means of antenna beams, referred to as beams herein. The network node 110 e.g. provides a number of cells referred to as cell1 and cell2, and may use these cells for communicating with e.g. a UE 120. The network node 110 may be a transmission and reception point e.g. a radio access network node such as a base station, e.g. a radio base station such as a NodeB, an evolved Node B (eNB, eNode B), an NR Node B (gNB), a base transceiver station, a radio remote unit, an Access Point Base Station, a base station router, a transmission arrangement of a radio base station, a stand-alone access point, a Wireless Local Area Network (WLAN) access point, an Access Point Station (AP STA), an access controller, a UE acting as an access point or a peer in a Device to Device (D2D) communication, or any other network unit capable of communicating with a UE within any of cell1 and cell2 served by the network node 110 depending e.g. on the radio access technology and terminology used.

User Equipments operate in the wireless communications network 100, such as a UE 120. The UE 120 may e.g. be an NR device, a mobile station, a wireless terminal, an NB-IoT device, an eMTC device, an NR RedCap device, a CAT-M device, a WiFi device, an LTE device and an a non-access point (non-AP) STA, a STA, that communicates via a base station such as e.g. the network node 110, one or more Access Networks (AN), e.g. RAN, to one or more core networks (CN). It should be understood by the skilled in the art that the UE relates to a non-limiting term which means any UE, terminal, wireless communication terminal, user equipment, (D2D) terminal, or node e.g. smart phone, laptop, mobile phone, sensor, relay, mobile tablets or even a small base station communicating within a cell.

CN nodes such as a CN node 130 operates in the wireless communications network 100. The CN node may e.g. be an AMF node or an SMF node.

See the below example, e.g. relating to BLER heat map based MCS backoff according to embodiments herein, wherein the new functions are marked as underlined, and wherein the input parameters are marked as underlined and bold.

Figure 1:
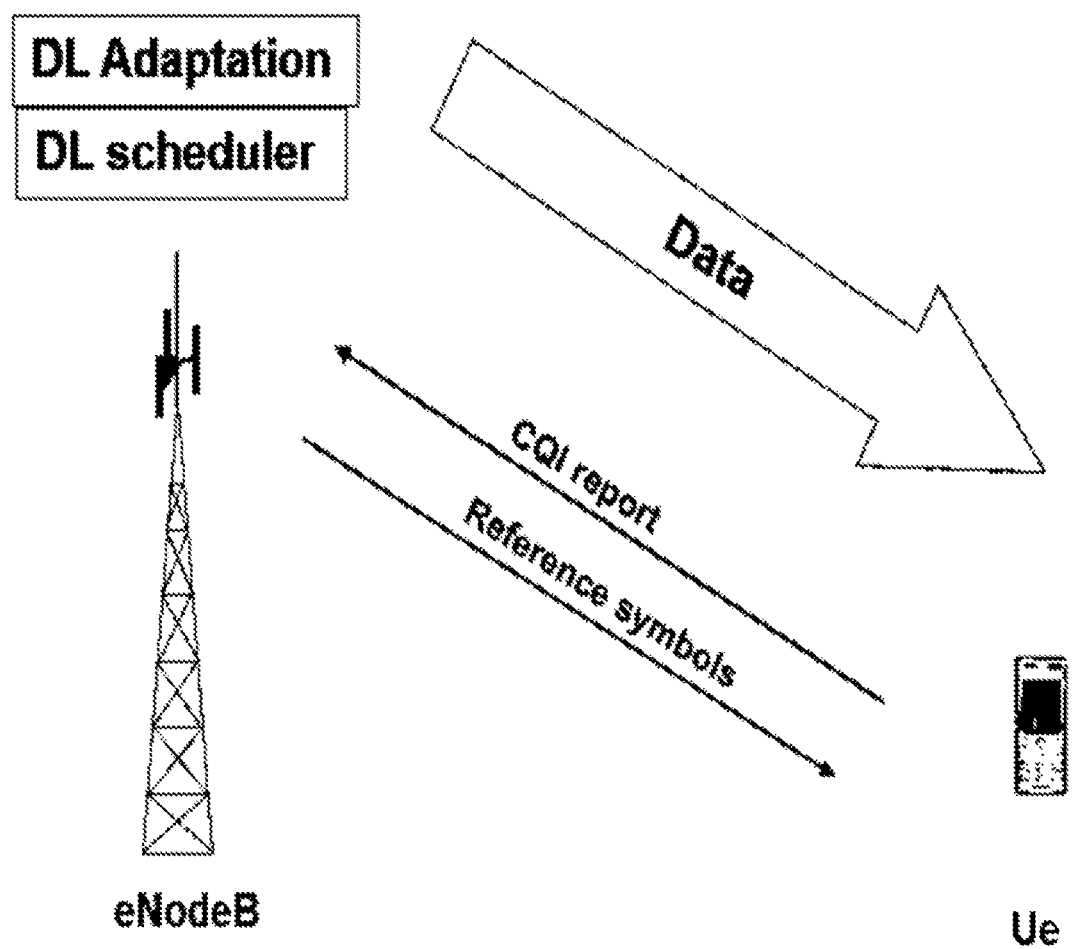
FIG. 1 is a schematic diagram illustrating a wireless communications network of prior art.
Figure 2:
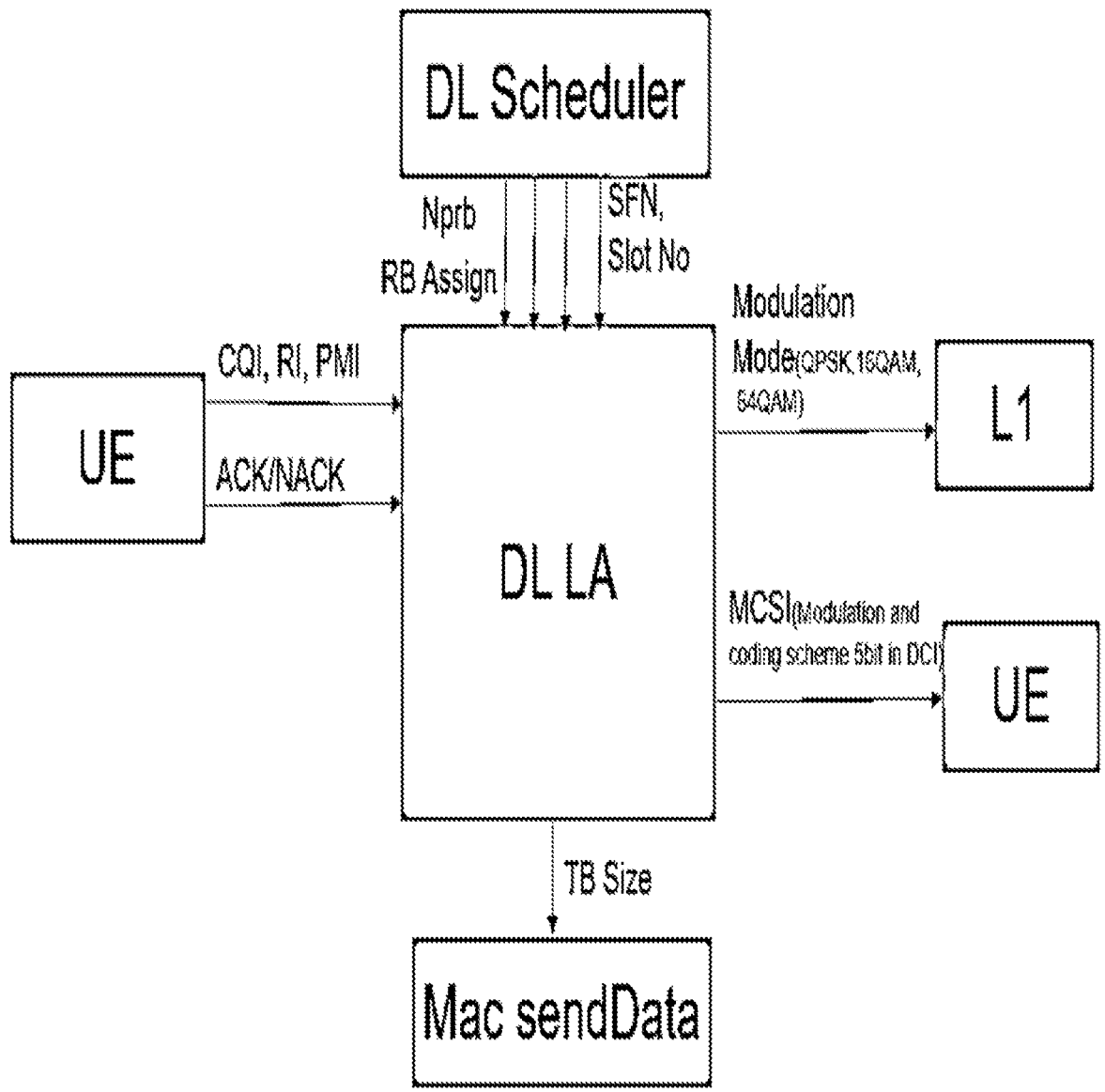
FIG. 2 is an illustration of a simplified link adaptation function overview.
Figure 3:
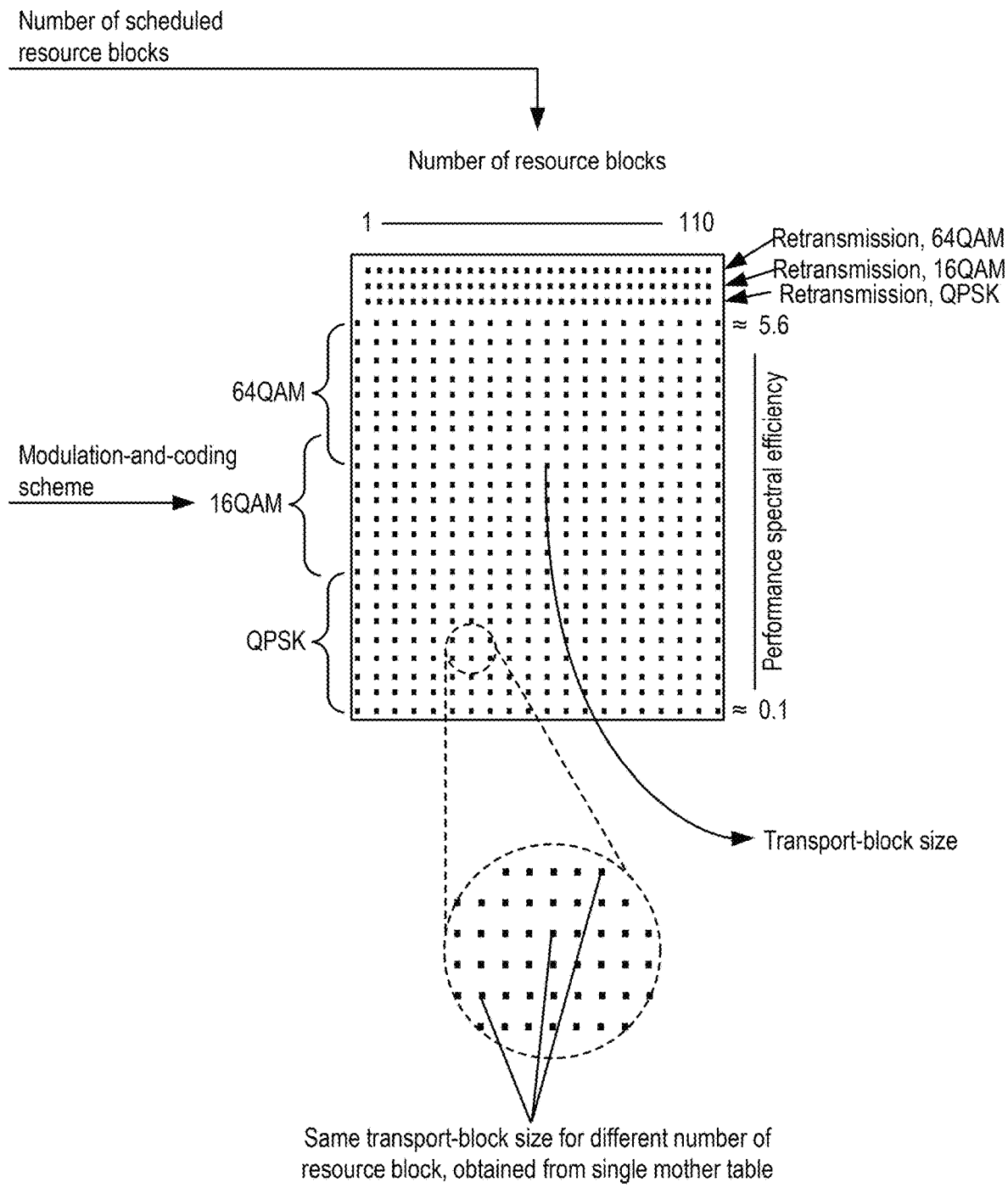
FIG. 3 is a block diagram illustrating computing of a transport block size in LTE.
Figure 4:
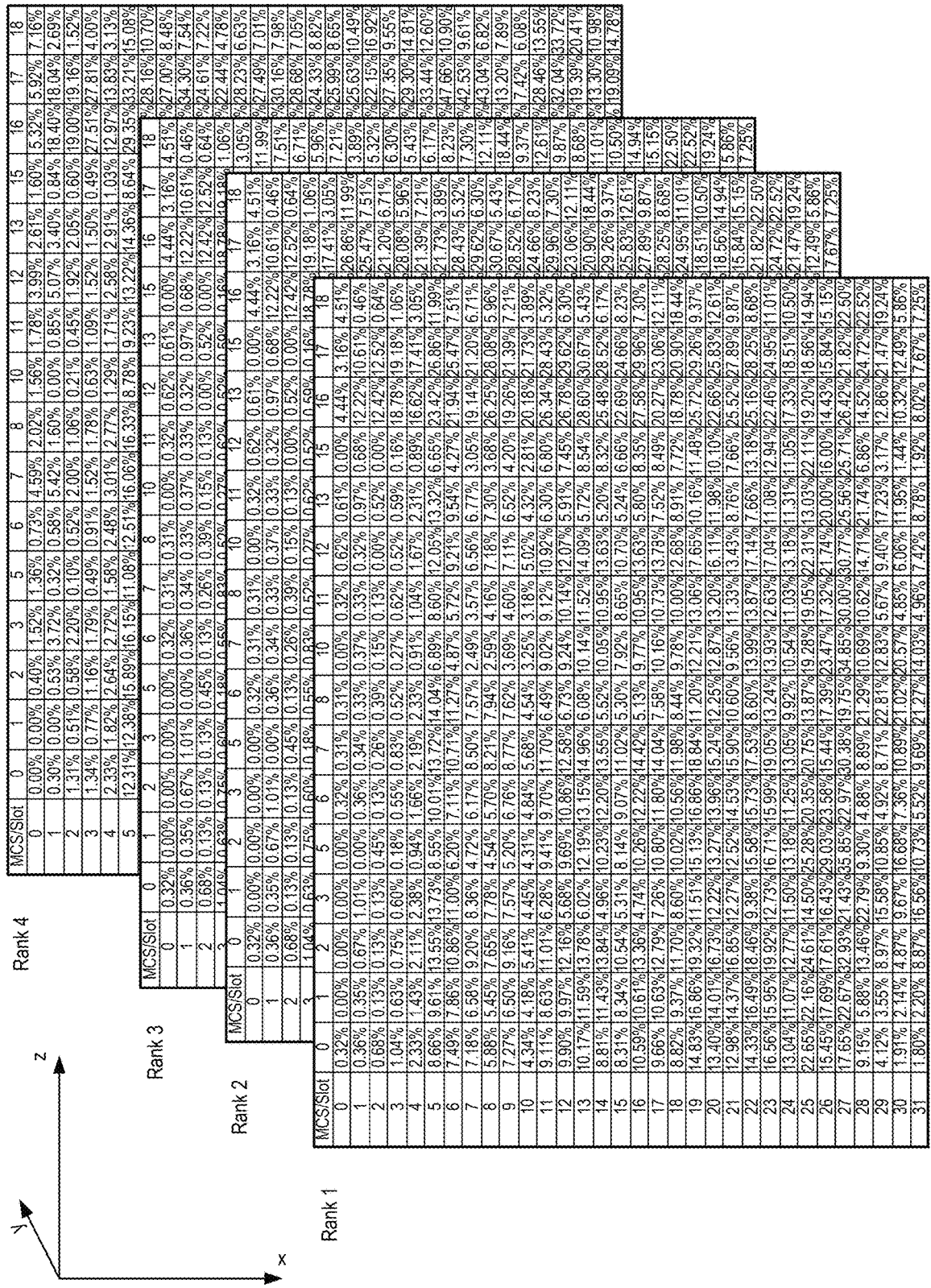
FIG. 4 is illustrating three-dimensional tables according to embodiments.

FIG. 4 shows an example of a three-dimensional table. In this example it is a BLER heat map which herein also may be mentioned as a BLER table. The x-axis in this example shows MCS with values of 0 to 31. The z-axis shows slots 0 to 18 and the y-axis shows the Rank 1 to 4. The percentage values in the table indicates the NACK/(ACK+NACK) ratio.

A BLER heat map when used herein means a matrix of measured BLER values connected to slot, rank and MCS. MCS back off when used herein means the adjustment applied to the link adaptation based on the value in the BLER heatmap. A slot when used herein refers to time interval which transmission take place (3gpp 38211 Table 4.3.2-1)

The Network Node 110 May, at Each Received DL HARQ Feedback (e.g. In Initial Tx Only) Perform the Following:
1. Populate and update any one or more out of three 3-dimensional tables: Count Table, BLER Table and/or ICC offset Table.
   Table count table [mcs, rank, slot]: count of harq per mcs vs. rank vs. slot. This means updating the ACK and NACK count tables for relevant mcs, rank and slot.
   Table bler [mcs, rank, slot]: NACK ratio per mcs vs. rank vs. slot. This means updating the BLER table based on the updates of count tables in previous step.
   Optional step: Table icc offset[mcs, rank, slot]: a table containing icc_offset calculated from the two tables above: This means that if the BLER table indicates that a BLER above a certain threshold and NACK and/or ACK count is above a second threshold then icc_offset is updated
      If (bler [mcs, rank, slot]>High BLER) & (count_ratio [mcs, rank, slot]>High Count Ratio):
         icc_offset=Δicc This means that icc offset will be applied,
      else: icc_offset=0 This means that icc offset will not be applied.

Reset the above tables after certain number of subframes (MAX SF Count) to avoid acting on old data and data overflow.

The Network Node 110 May, at Each DL Transmission, i.e. At Each Slot, Perform:
   Run a legacy Link adaptation to choose the rank and initial mcs. This is input for icc_offset.
   Lookup icc_offset"[mcs, rank, slot]" to get icc_offset for this slot. This is to select new MCS based on count_table and BLER table, as explained in above.
   Schedule the UE 120 with the adjusted mcs.

According to embodiments herein an example method may be provided to measure BLER per rank, MCS and slot at each HARQ feedback on initial transmission, as shown in the BLER heat map of FIG. 4. In an example, a BLER target of 10% may be applied to an initial Transmission (Tx). The measurements are used to adjust the ICC estimate. This is a rank, MCS, slot specific adjustment on top of existing, legacy ICC adjustment according to ACK/NACK feedback loop, that is agnostic to rank, MCS and slot.

For example, if the BLER heatmap shows that a certain ICC X has a high BLER for a certain rank Y vs a certain slot Z and if legacy LA chose that ICC X for slot Z vs rank Y then delta ICC will be applied to reduce the ICC.

Methods herein may in one aspect be performed by the network node 110. As an alternative, a Distributed Node (DN) and functionality, e.g. comprised in a cloud 140 as shown in FIG. 5, may be used for performing or partly performing the methods.

FIG. 5 shows an example method performed by the network node 110, e.g. for handling link adaptation for a communication between the network node 110 and the UE 120 in a wireless communications network 100.

Figure 6:
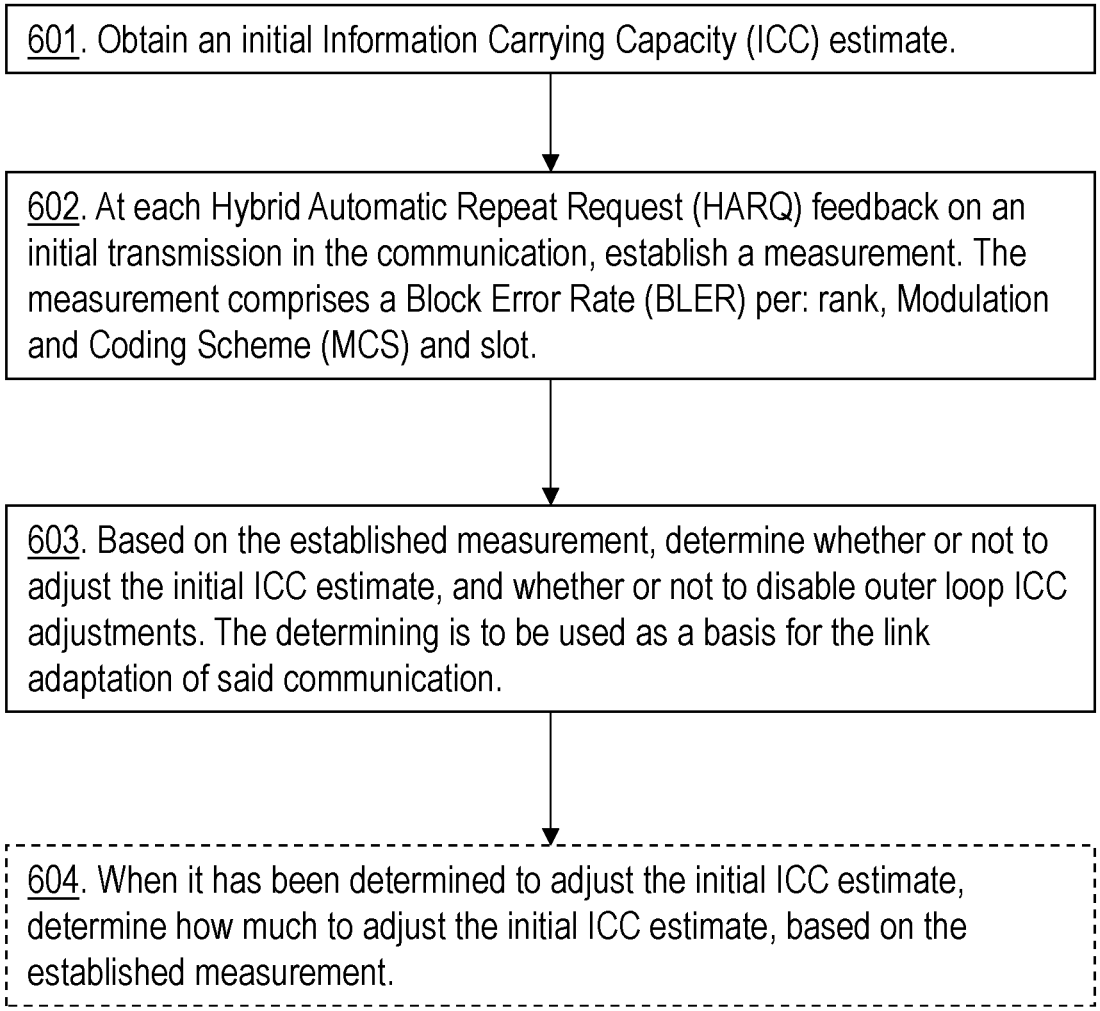
FIG. 6 is a flow chart illustrating the method according to embodiments.

The method comprises the actions below which is shown in the flowchart of FIG. 6:

Action 601

The network node 110 obtains an initial ICC estimate.

Initially of this method, network node 110 obtains an ICC estimate, this is referred to as an initial ICC estimate. Later on, it will be determined whether or not this initial ICC estimate shall be adjusted. In other words, the initial ICC estimate is an uncompensated ICC estimate that later on, may or may not be compensated according to embodiments herein.

The initial ICC estimate may e.g. be used to estimate an initial MCS. The initial ICC estimate when used herein may mean information carrying capacity based on channel quality measurements.

Action 602

The network node 110 establishes a measurement at each HARQ feedback on an initial transmission in the communication. The measurement comprises a BLER per: Rank, MCS and slot.

To establish the BLER per rank, MCS and slot measurements, also referred to as the BLER heat map, gives the possibility to compensate when the BLER deviates significantly from the target.

In some embodiments, the network node 110 establishes a measurement, that further comprises: Counting per: rank, MCS; and slot, ACKs, and/or NACKs, received in HARQ feedbacks during the initial transmission in the communication. This is e.g. to realize the measurement of the BLER, it may also serve as way to assess the amount of ACKs and NACKs that have been used in the BLER calculation.

Action 603

Based on the established measurement, the network node 110 determines whether or not to adjust the initial ICC estimate, and disable outer loop ICC adjustments.

In some embodiments, this means that the network node 110 determines whether or not to adjust the initial ICC estimate.

In some further embodiments, this e.g. means that the network node 110 determines whether or not to disable outer loop ICC adjustments. This means that the ICC estimate may not be adjusted based on HARQ ACK or HARQ NACK receptions.

In some yet further embodiments, this e.g. means that the network node 110 determines whether or not to adjust the initial ICC estimate, and whether or not to disable outer loop ICC adjustments.

In some of these embodiments, the determining is to be used as a basis for the link adaptation of said communication. This will be explained more in detail below.

In some embodiments the network node determines whether or not to adjust the initial ICC estimate and/or disable outer loop ICC adjustments based on the number of ACKs and/or NACKs counted in the HARQ feedback.

In some embodiments, the network node 110 determines to adjust the initial ICC estimate and/or disable outer loop ICC adjustments when any one or more out of:
- the BLER per rank, MCS, and slot exceeds a first threshold, also referred to as High_BLER.
- the number of NACK counts per rank, MCS and slot exceeds a second threshold also referred to as High_Count_Ratio, and/or
- the number of ACK counts per rank, MCS and slot is below a third threshold, also referred to as Low_Count_Ratio.

In some embodiments, the network node 110 determines to not adjust the initial ICC estimate and/or not disable outer loop ICC adjustments when any one or more out of:
- the BLER per rank, MCS, and slot is below a first threshold, also referred to as High_BLER,
- the number of NACK counts per rank, MCS and slot is below a second threshold also referred to as High_Count_Ratio, and/or
- the number of ACK counts per rank, MCS and slot exceeds a third threshold, also referred to as Low_Count_Ratio.

Action 604

In some embodiments, when it has been determined to adjust the initial ICC estimate, the network node 110 may determine how much to adjust the initial ICC estimate, based on the established measurement. This may e.g. be performed by applying a fixed value for the ICC adjustment or proportional to the difference between the measured BLER and the BLER target.

The method will now be further explained and exemplified in below embodiments. These below embodiments may be combined with any suitable embodiment as described above.

The below example embodiments relate to a Link adaptation flow according to embodiments herein. The new functionality is marked as underlined.

Prior to each DL transmission the network node 110 may perform the following:
1. Receive a CQI report comprising a CQI estimate, e.g. from the UE 120.
2. The CQI estimate is translated to an ICC estimate, also referred to as the initial ICC estimate.
3. Possibly adjust the initial ICC estimate according to ACK/NACK feedback loop (input from step 10 below).

The Steps 1, 2 and/or 3 are performed to obtain the initial ICC estimate, mentioned in Action 601.
4. Determine the MCS based on the initial ICC estimate (possibly adjusted).
5. Adjust ICC according to the outcome of the new ICC adjustment algorithm (input from step 9 below) This is related to Action 603 and 604 described above.
6. Determine the MCS based on the final adjusted ICC. This is related to legacy link adaptation.
7. Calculate TBS (transport block size) based on legacy link adaptation (where MCS is one of many input parameters).
8. Transmit data using the calculated TBS At each received DL HARQ Feedback (at initial Tx), the network node 110 may perform the following:
9. Calculate BLER table (NACK ratio per rank, mcs, slot) and count table (ACK+NACK count per rank, mcs, slot) This relates to Action 602 described above.
10. Re-calculate Outer loop adjustment depending on the outcome of Action 603 described above.
   a. This step may be skipped based on above calculations (input from step 9 above) This is since the network node 110 may determine whether or not disable outer loop ICC adjustments as mentioned in Action 603 described above.

The ICC adjustment algorithm according to some example embodiments herein:

At each received DL HARQ FB (in initial Tx) the network node 110 may update any one or more out of the following three 3-dimensional tables: The three tables comprise the Count Table, the BLER Table and/or the ICC offset Table. as follows:

1.—The BLER table [#rank, #mcs, #slot]: e.g. comprising NACK ratio per MCS vs rank vs slot. This means updating the BLER table based on the updated count tables.

This function may store the NACK ratio per MCS vs rank vs slot for all connected UEs or selected UEs such as e.g. the UE 120.

This relates to Action 602, wherein, at each HARQ feedback on an initial transmission in the communication, the network node 110 establishes a measurement, which measurement comprises a BLER per: rank, Modulation and Coding Scheme, MCS, and slot.

2. The count_table table [#rank, #mcs, #slot]: containing count of HARQ per mcs vs rank vs slot. This means updating the ACK and NACK count tables for relevant mcs, rank and slot.

This function may store the ACK and NACK counts per MCS vs rank vs slot, so that the link adaptation algorithm can take back off decisions based on reasonable amount of NACK and/or ACK counts for high NACK ratios per MCS vs rank vs slot. This means that for every combination of (slot, rank, mcs) there will be counters for the amount of received ACKs and NACKs respectively.

3. The ICC offset Table comprises icc_offset calculated from the two tables above. This means that if the BLER table indicate BLER above a certain threshold, e.g. also referred to as the first threshold, and NACK and/or ACK count is above a second threshold then icc_offset is updated.

The network node 110 may reset the above tables after a certain number of DL feedback (MAX_SF_Count) also referred to as an SF Count threshold. SF means subframes which is an amount of time. This is to avoid acting on old data and to avoid data overflow.

High_Bler, High_Count_Ratio, MAX_SF_Count are tunable input parameters also referred to as thresholds.

Functions like BLER [#rank, #mcs, #slot] and count_table [#rank, #mcs, #slot] may also be utilized to adjust outer loop ICC (SINR). As mentioned above in action 603, network node 110 may determine whether or not to disable outer loop ICC adjustments.

If certain MCS vs slot vs rank has high BLER it could be good to skip NACK adjustment for that mcs vs slot vs rank.

The wording "MCS vs slot vs rank" when used herein e.g. means "a function of these three attributes".

Outer Loop Adjustment (OLA)_adj [#rank, #mcs, #slot] meaning that the legacy Outer-Loop Adjustment will according to some embodiments herein be conditioned by action 603 which decides if the adjustment value should be updated at HARQ ACK/NACK reception. It may comprise:

For each rank, mcs, slot HARQ NACK feedback the network node 110 may perform the following:

If (BLER [MCS, rank, slot]>High_BLER) & (count_ratio [mcs, rank, slot]>High_Count_Ratio):
Skip outerloop adjustment
else: adjust outerloop This means that action 603 which decides if the adjustment value should be updated at HARQ ACK/NACK reception At each DL transmission, i.e. step 5 in the new LA algorithm, the network node 110 may perform:
icc_offset[#rank, #mcs, #slot]: meaning that if the BLER table indicates that the BLER is above certain threshold, e.g. first threshold, and NACK and/or ACK count is above a second threshold, then the icc_offset is updated.

0 For each rank, mcs, slot:
If (BLER [MCS, rank, slot]>High_Bler) & (count_ratio [MCS, rank, slot]>High_Count_Ratio),
ICC_offset=ΔICC. This means that icc offset will be applied
else: ICC_offset=0. This means that icc offset will not be applied.

ΔICC may be a fixed parameter or a value dependent on MCS and derived from simulations or field data to reflect unilinear nature of ICC over MCS Lookup icc_offset [mcs, rank, slot] to get icc_offset per ri, mcs, and slot and adjust the icc estimate. This means that if the BLER table indicates that the BLER is above certain threshold, e.g. first threshold, and NACK and/or ACK count is above a second threshold, then icc_offset is updated.

It may be costly memory utilization if the bler [#rank, #mcs, #slot] and count_ratio [#rank, #mcs, #slot] are stored per UE. In that case the icc_offset functionality may preferably be applied for UEs such as the UE 120, that has high data in the buffer.

Figure 7A:
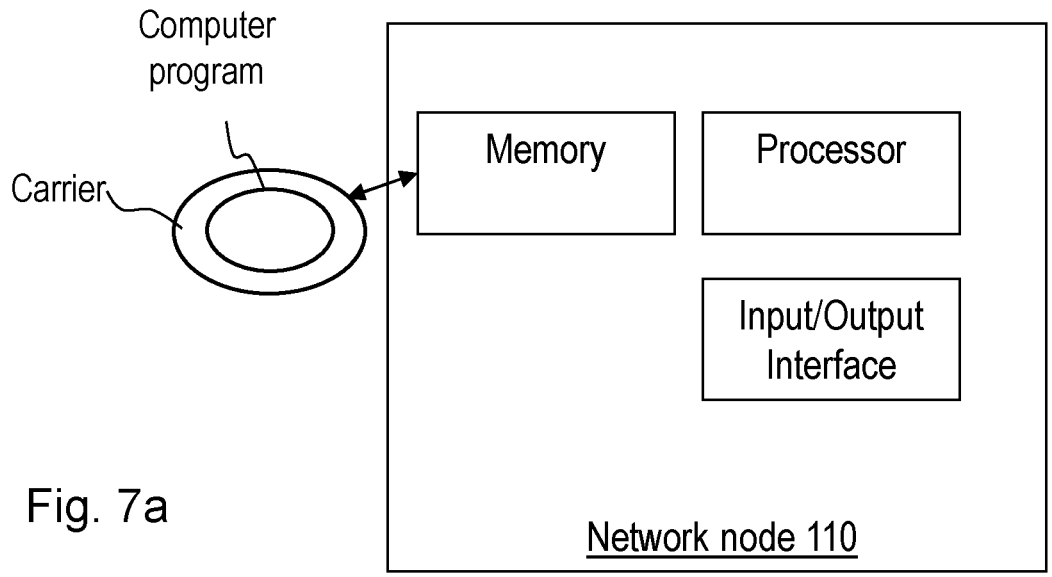
FIG. 7a and FIG. 7b are block diagrams illustrating embodiments of a network node.
Figure 7B:
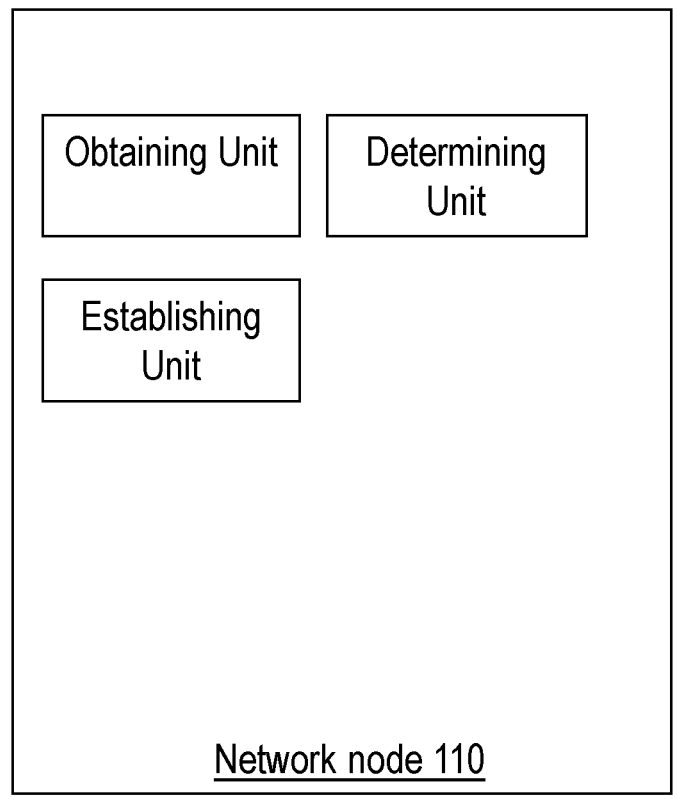

FIGS. 7a and 7b shows an example of arrangement in the network node 110.

The network node 110 may comprise an input and output interface configured to communicate with each other. The input and output interface may comprise a wireless receiver (not shown) and a wireless transmitter (not shown).

The network node 110 may comprise an obtaining unit, a determining unit, and an establishing unit to perform the method actions as described herein.

The embodiments herein may be implemented through a respective processor or one or more processors, such as the processor of a processing circuitry in the network node 110 depicted in FIG. 7a, together with computer program code for performing the functions and actions of the embodiments herein. The program code mentioned above may also be provided as a computer program product, for instance in the form of a data carrier carrying computer program code for performing the embodiments herein when being loaded into the network node 110. One such carrier may be in the form of a CD ROM disc. It is however feasible with other data carriers such as a memory stick. The computer program code may furthermore be provided as pure program code on a server and downloaded to the network node 110.

The network node 110 may further comprise respective a memory comprising one or more memory units. The memory comprises instructions executable by the processor in the network node 110.

The memory is arranged to be used to store instructions, data, configurations, and applications to perform the methods herein when being executed in the network node 110.

In some embodiments, a computer program comprises instructions, which when executed by the at least one processor, cause the at least one processor of the network node 110 to perform the actions above.

In some embodiments, a respective carrier comprises the respective computer program, wherein the carrier is one of an electronic signal, an optical signal, an electromagnetic signal, a magnetic signal, an electric signal, a radio signal, a microwave signal, or a computer-readable storage medium.

Those skilled in the art will also appreciate that the functional modules in the network node 110, described below may refer to a combination of analog and digital circuits, and/or one or more processors configured with software and/or firmware, e.g. stored in the network node 110, that when executed by the respective one or more processors such as the processors described above cause the respective at least one processor to perform actions according to any of the actions above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used.

Below, some example embodiments 1-12 are shortly described. See e.g. FIGS. 6, 7a, and 7b.

Embodiment 1. A method performed by a network node 110 e.g. for handling link adaptation for a communication between the network node 110 and a User Equipment, UE, 120 in a wireless communications network 100, the method comprising any one or more out of:
obtaining an initial Information Carrying Capacity, ICC, estimate,
establishing a measurement at each Hybrid Automatic Repeat Request, HARQ, feedback on an initial transmission in the communication, which measurement comprises a Block Error Rate, BLER, per: rank, Modulation and Coding Scheme, MCS, and slot, and
based on the established measurement, determining any one or more out of: whether or not to adjust the initial ICC estimate, and disable outer loop ICC adjustments, which determining is to be used as a basis for the link adaptation of said communication.

Embodiment 2. The method according to embodiment 1, wherein establishing 602 a measurement, further comprises:
counting per: rank, MCS; and slot, Acknowledgements, ACKs, and/or Non-Acknowledgements, NACKs, received in HARQ feedbacks during the initial transmission in the communication, and wherein
the determining of whether or not to adjust the initial ICC estimate and/or disable outer loop ICC adjustments, is further based on the number of ACKs and/or NACKs counted in the HARQ feedback.

Embodiment 3. The method according to any of the embodiments 1-2, comprising:
when it has been determined to adjust the initial ICC estimate, determining how much to adjust the initial ICC estimate, based on the established measurement.

Embodiment 4. The method according to any of the embodiments 1-3, wherein the determining of whether or not to adjust the initial ICC estimate and/or disable outer loop ICC adjustments, comprises:

when any one or more out of:
the BLER per rank, MCS, and slot exceeds a first threshold,
the number of NACK counts per rank, MCS and slot exceeds a second threshold, and/or
the number of ACKs counts per rank, MCS and slot is below a third threshold,
determining to adjust the initial ICC estimate and/or disable outer loop ICC adjustments.

Embodiment 5. The method according to any of the embodiments 1-4, wherein the determining of whether or not to adjust the initial ICC estimate and/or disable outer loop ICC adjustments, comprises:
when any one or more out of:
the BLER per rank, MCS, and slot is below a first threshold, and
the number of NACK counts per rank, MCS and slot is below a second threshold, and
the number of ACKs counted per rank, MCS and slot exceeds a third threshold,
determining to not adjust the initial ICC estimate and/or not disable outer loop ICC adjustments.

Embodiment 6. A computer program comprising instructions, which when executed by a processor, causes the processor to perform actions according to any of the embodiments 1-5.

Embodiment 7. A carrier comprising the computer program of embodiment 6, wherein the carrier is one of an electronic signal, an optical signal, an electromagnetic signal, a magnetic signal, an electric signal, a radio signal, a microwave signal, or a computer-readable storage medium.

Embodiment 8. A network node 110 e.g. configured to handle link adaptation for a communication between the network node 110 and a User Equipment, UE, 120 in a wireless communications network 100, the network node further being configured to any one or more out of:
obtain, e.g. by means of an obtaining unit, an initial Information Carrying Capacity, ICC, estimate,
establish a measurement, at each Hybrid Automatic Repeat Request, HARQ, feedback on an initial transmission in the communication, e.g. by means of an establishing unit, which measurement is adapted to comprise a Block Error Rate, BLER, per: rank, Modulation and Coding Scheme, MCS, and slot, and
based on the established measurement, determine, e.g. by means of a determining unit, any one or more out of: whether or not to adjust the initial ICC estimate, and disable outer loop ICC adjustments, which determining is adapted to be used as a basis for the link adaptation of said communication.

Embodiment 9. The network node 110 according to embodiment 8 further configured to establish, e.g. by means of the establishing unit, the measurement by:
counting per: rank, MCS; and slot, Acknowledgements, ACKs, and/or Non-Acknowledgements, NACKs, received in HARQ feedbacks during the initial transmission in the communication, and
wherein the network node is further configured to determine, e.g. by means of the determining unit, any one or more out of: whether or not to adjust the initial ICC estimate, and disable outer loop ICC adjustments, based on the number of ACKs and/or NACKs counted in the HARQ feedback.

Embodiment 10. The network node 110 according to any of the embodiments 8-9, further being configured to:
when it has been determined to adjust the initial ICC estimate, determine, e.g. by means of the determining unit, how much to adjust the initial ICC estimate, based on the established measurement.

Embodiment 11. The network node 110 according to any of the embodiments 8-further configured to determine, e.g. by means of the determining unit, whether or not to adjust the initial ICC estimate and/or disable outer loop ICC adjustments by:
when any one or more out of:
the BLER per rank, MCS, and slot exceeds a first threshold,
the number of NACK counts per rank, MCS and slot exceeds a second threshold, and/or
the number of ACKs counts per rank, MCS and slot is below a third threshold,
determining to adjust the initial ICC estimate and/or disable outer loop ICC adjustments.

Embodiment 12. The network node 110 according to any of the embodiments 8-11, further configured to determine, e.g. by means of the determining unit, whether or not to adjust the initial ICC estimate and/or disable outer loop ICC adjustments by:
when any one or more out of:
the BLER per rank, MCS, and slot is below a first threshold, and
the number of NACK counts per rank, MCS and slot is below a second threshold, and
the number of ACKs counted per rank, MCS and slot exceeds a third threshold,
determining to not adjust the initial ICC estimate and/or not disable outer loop ICC adjustments.

Further Extensions and Variations

Figure 8:
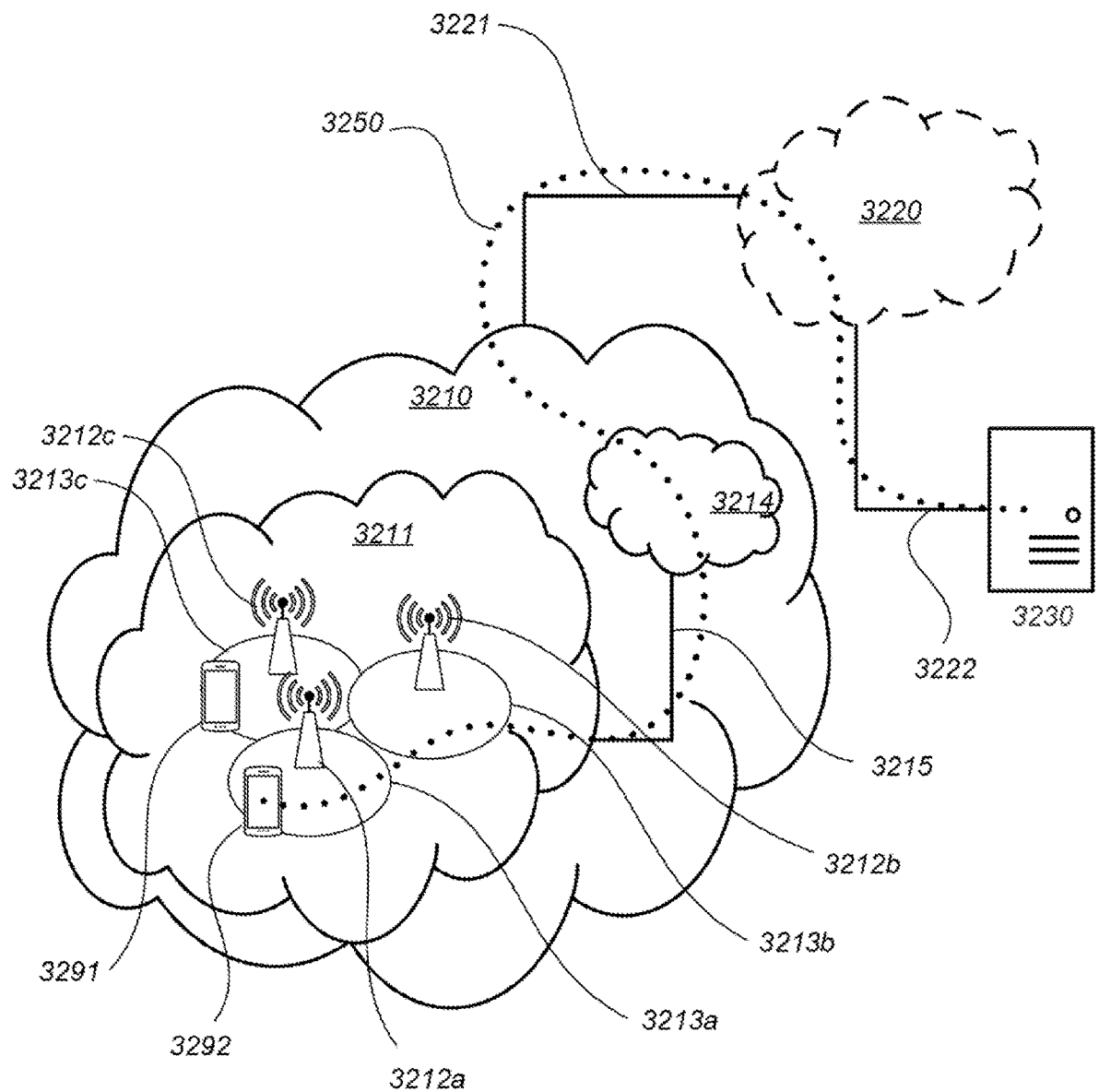
FIG. 8 schematically illustrates a telecommunication network connected via an intermediate network to a host computer.

With reference to FIG. 8, in accordance with an embodiment, a communication system includes a telecommunication network 3210 such as the wireless communications network 100, e.g. an IoT network, or a WLAN, such as a 3GPP-type cellular network, which comprises an access network 3211, such as a radio access network, and a core network 3214. The access network 3211 comprises a plurality of base stations 3212a, 3212b, 3212c, such as the network node 110, access nodes, AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) e.g. the UE 120 such as a Non-AP STA 3291 located in coverage area 3213c is configured to wirelessly connect to, or be paged by, the corresponding base station 3212c. A second UE 3292 e.g. the UE 120 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 8 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 9. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown) served by the base station 3320. The communication interface 3326 may be configured to facilitate a connection 3360 to the host computer 3310. The connection 3360 may be direct or it may pass through a core network (not shown in FIG. 9) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 9:
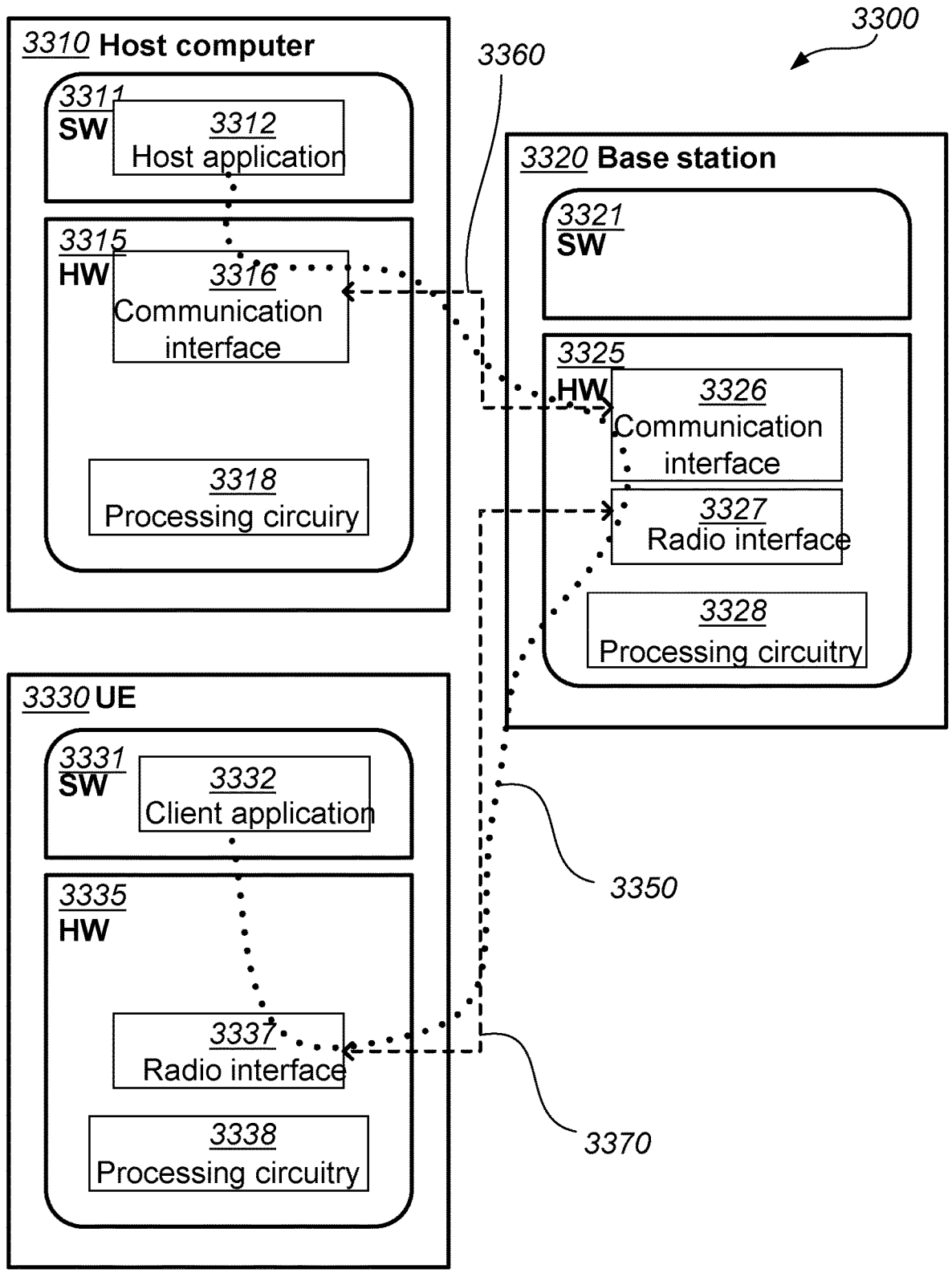
FIG. 9 is a generalized block diagram of a host computer communicating via a base station with a user equipment over a partially wireless connection.

It is noted that the host computer 3310, base station 3320 and UE 3330 illustrated in FIG. 9 may be identical to the host computer 3230, one of the base stations 3212a, 3212b, 3212c and one of the UEs 3291, 3292 of FIG. 8, respectively. This is to say, the inner workings of these entities may be as shown in FIG. 9 and independently, the surrounding network topology may be that of FIG. 8.

In FIG. 9, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the applicable RAN effect: data rate, latency, power consumption, and thereby provide benefits such as corresponding effect on the OTT service: e.g. reduced user waiting time, relaxed restriction on file size, better responsiveness, extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

FIG. 10 is a flowchart illustrating a method implemented in a communication system, in accordance with one embodiment. The communication system includes a host computer, a base station such as the network node 110, and a UE such as the UE 120, which may be those described with reference to FIG. 9 and FIG. 8. For simplicity of the present disclosure, only drawing references to FIG. 10 will be included in this section. In a first action 3410 of the method, the host computer provides user data. In an optional subaction 3411 of the first action 3410, the host computer provides the user data by executing a host application. In a second action 3420, the host computer initiates a transmission carrying the user data to the UE. In an optional third action 3430, the base station transmits to the UE the user data which was carried in the transmission that the host computer initiated, in accordance with the teachings of the embodiments described throughout this disclosure. In an optional fourth action 3440, the UE executes a client application associated with the host application executed by the host computer.

FIG. 11 is a flowchart illustrating a method implemented in a communication system, in accordance with one embodiment. The communication system includes a host computer, a base station such as a AP STA, and a UE such as a Non-AP STA which may be those described with reference to FIG. 8 and FIG. 9. For simplicity of the present disclosure, only drawing references to FIG. 11 will be included in this section. In a first action 3510 of the method, the host computer provides user data. In an optional subaction (not shown) the host computer provides the user data by executing a host application. In a second action 3520, the host computer initiates a transmission carrying the user data to the UE. The transmission may pass via the base station, in accordance with the teachings of the embodiments described throughout this disclosure. In an optional third action 3530, the UE receives the user data carried in the transmission.

FIG. 12 is a flowchart illustrating a method implemented in a communication system, in accordance with one embodiment. The communication system includes a host computer, a base station such as a AP STA, and a UE such as a Non-AP STA which may be those described with reference to FIG. 8 and FIG. 9. For simplicity of the present disclosure, only drawing references to FIG. 12 will be included in this section. In an optional first action 3610 of the method, the UE receives input data provided by the host computer. Additionally or alternatively, in an optional second action 3620, the UE provides user data. In an optional subaction 3621 of the second action 3620, the UE provides the user data by executing a client application. In a further optional subaction 3611 of the first action 3610, the UE executes a client application which provides the user data in reaction to the received input data provided by the host computer. In providing the user data, the executed client application may further consider user input received from the user. Regardless of the specific manner in which the user data was provided, the UE initiates, in an optional third subaction 3630, transmission of the user data to the host computer. In a fourth action 3640 of the method, the host computer receives the user data transmitted from the UE, in accordance with the teachings of the embodiments described throughout this disclosure.

FIG. 13 is a flowchart illustrating a method implemented in a communication system, in accordance with one embodiment. The communication system includes a host computer, a base station such as a AP STA, and a UE such as a Non-AP STA which may be those described with reference to FIG. 8 and FIG. 9. For simplicity of the present disclosure, only drawing references to FIG. 13 will be included in this section. In an optional first action 3710 of the method, in accordance with the teachings of the embodiments described throughout this disclosure, the base station receives user data from the UE. In an optional second action 3720, the base station initiates transmission of the received user data to the host computer. In a third action 3730, the host computer receives the user data carried in the transmission initiated by the base station.

The invention claimed is:

1. A method performed by a network node for handling link adaptation for a communication between the network node and a User Equipment, UE, in a wireless communications network, the method comprising:
   obtaining an initial Information Carrying Capacity, ICC, estimate;
   establishing a measurement at each Hybrid Automatic Repeat Request, HARQ, feedback on an initial transmission in the communication, which measurement comprises a Block Error Rate, BLER, per: rank, Modulation and Coding Scheme, MCS, and slot, and
   based on the established measurement, determining whether or not to adjust the initial ICC estimate, and whether or not to disable outer loop ICC adjustments, which determining is to be used as a basis for the link adaptation of said communication.

2. The method according to claim 1, wherein establishing a measurement, further comprises:
   counting per: rank, MCS; and slot, Acknowledgements, ACKs, and/or Non-Acknowledgements, NACKs, received in HARQ feedbacks during the initial transmission in the communication, and wherein
   the determining of whether or not to adjust the initial ICC estimate and/or disable outer loop ICC adjustments, is further based on the number of ACKs and/or NACKs counted in the HARQ feedback.

3. The method according to claim 1, comprising:

when it has been determined to adjust the initial ICC estimate, determining how much to adjust the initial ICC estimate, based on the established measurement.

4. The method according to claim 1, wherein the determining of whether or not to adjust the initial ICC estimate and whether or not to disable outer loop ICC adjustments, comprises:
when the BLER per rank, MCS, and slot exceeds a first threshold
determining to adjust the initial ICC estimate and/or disable outer loop ICC adjustments.

5. The method according to claim 1, wherein the determining of whether or not to adjust the initial ICC estimate and whether or not to disable outer loop ICC adjustments, comprises:
when the number of NACK counts per rank, MCS and slot exceeds a second threshold, determining to adjust the initial ICC estimate and/or disable outer loop ICC adjustments.

6. The method according to claim 1, wherein the determining of whether or not to adjust the initial ICC estimate and whether or not to disable outer loop ICC adjustments, comprises:
when the number of ACK counts per rank, MCS and slot is below a third threshold, determining to adjust the initial ICC estimate and/or disable outer loop ICC adjustments.

7. The method according to claim 1, wherein the determining of whether or not to adjust the initial ICC estimate and whether or not to disable outer loop ICC adjustments, comprises:
when the BLER per rank, MCS, and slot is below a first threshold,
determining to not adjust the initial ICC estimate and/or not disable outer loop ICC adjustments.

8. The method according to claim 1, wherein the determining of whether or not to adjust the initial ICC estimate and whether or not to disable outer loop ICC adjustments, comprises:
when the number of NACK counts per rank, MCS and slot is below a second threshold,
determining to not adjust the initial ICC estimate and/or not disable outer loop ICC adjustments.

9. The method according to claim 1, wherein the determining of whether or not to adjust the initial ICC estimate and whether or not to disable outer loop ICC adjustments, comprises:
when the number of ACK counts per rank, MCS and slot exceeds a third threshold,
determining to not adjust the initial ICC estimate and/or not disable outer loop ICC adjustments.

10. A network node configured to handle link adaptation for a communication between the network node and a User Equipment, UE, in a wireless communications network, the network node comprising processing circuitry, the processing circuitry being configured to cause the network node to:
obtain an initial Information Carrying Capacity, ICC, estimate,
establish a measurement, at each Hybrid Automatic Repeat Request, HARQ, feedback on an initial transmission in the communication, which measurement is adapted to comprise a Block Error Rate, BLER, per: rank, Modulation and Coding Scheme, MCS, and slot, and
based on the established measurement, determine whether or not to adjust the initial ICC estimate, and whether or not to disable outer loop ICC adjustments, which determining is adapted to be used as a basis for the link adaptation of said communication.

11. The network node according to claim 10, further being configured to establish, the measurement by:
counting per: rank, MCS; and slot, Acknowledgements, ACKs, and/or Non-Acknowledgements, NACKs, received in HARQ feedbacks during the initial transmission in the communication, and
wherein the network node is further configured to determine, whether or not to adjust the initial ICC estimate, and/or disable outer loop ICC adjustments, based on the number of ACKs and/or NACKs counted in the HARQ feedback.

12. The network node according to claim 10, further being configured to:
when it has been determined to adjust the initial ICC estimate, determine how much to adjust the initial ICC estimate, based on the established measurement.

13. The network node according to claim 10, further being configured to determine, whether or not to adjust the initial ICC estimate and whether or not to disable outer loop ICC adjustments comprises:
when the BLER per rank, MCS, and slot exceeds a first threshold,
determine to adjust the initial ICC estimate and/or disable outer loop ICC adjustments.

14. A non-transitory computer-readable storage medium comprising instructions which, when executed by processing circuitry of a network node for handling link adaptation for a communication between the network node and a User Equipment, UE, in a wireless communication network, cause the network node to:
obtain an initial Information Carrying Capacity, ICC, estimate;
establish a measurement at each Hybrid Automatic Repeat Request, HARQ, feedback on an initial transmission in the communication, which measurement comprises a Block Error Rate, BLER, per: rank, Modulation and Coding Scheme, MCS, and slot, and
based on the established measurement, determine whether or not to adjust the initial ICC estimate, and whether or not to disable outer loop ICC adjustments, which determining is to be used as a basis for the link adaptation of said communication.

* * * * *